United States Patent [19]
Bowers et al.

[11] Patent Number: 5,993,897
[45] Date of Patent: Nov. 30, 1999

[54] PRE-MIXED POLYMER COMPOSITIONS

[76] Inventors: Frank Bowers; Jacqueline Mary Bowers, both of 487 Cascia Drive, Kelowna, British Columbia, Canada, V1W 3C6

[21] Appl. No.: 09/050,409

[22] Filed: Mar. 30, 1998

Related U.S. Application Data

[63] Continuation of application No. 08/809,172, Mar. 18, 1997, abandoned.

[51] Int. Cl.$^6$ .................................................. B05D 3/10
[52] U.S. Cl. ...................... 427/136; 427/214; 427/222; 427/314; 427/322; 427/341
[58] Field of Search .................................. 427/214, 222, 427/136, 314, 322, 341

[56] References Cited

U.S. PATENT DOCUMENTS

| | | | |
|---|---|---|---|
| 4,107,100 | 8/1978 | Perterhans et al. | 521/137 |
| 4,112,176 | 9/1978 | Bailey | 428/304 |
| 5,385,953 | 1/1995 | McClellan | 521/109.1 |

FOREIGN PATENT DOCUMENTS

| | | |
|---|---|---|
| 5473 | 11/1979 | European Pat. Off. . |
| 216344 | 4/1987 | European Pat. Off. . |
| 3534107 | 4/1987 | Germany . |
| 49-106533 | 10/1974 | Japan . |
| 50-158631 | 12/1974 | Japan . |
| 56-161456 | 12/1981 | Japan . |
| 59-041501 | 3/1984 | Japan . |
| 2246077 | 1/1992 | United Kingdom . |
| 91/06594 | 5/1991 | WIPO . |
| 92/13138 | 8/1992 | WIPO . |
| 92/19669 | 11/1992 | WIPO . |
| 93/06991 | 4/1993 | WIPO . |
| 94/04755 | 3/1994 | WIPO . |

*Primary Examiner*—Erma Cameron
*Attorney, Agent, or Firm*—Charles J Brown

[57] ABSTRACT

The invention concerns the production of a pre-mixed porous polymeric composition wherein granules of rubber are encapsulated with a first pre-polymer which is cured, a second uncured pre-polymer is then mixed with the encapsulated granules in a substantially moisture-free environment, the mixture is deposited into containers substantially impermeable to water vapor and is then stored for later use so that without further mixing it may be applied to a suitable sub-base surface and the second pre-polymer is allowed to polymerize by reaction with water.

4 Claims, 1 Drawing Sheet

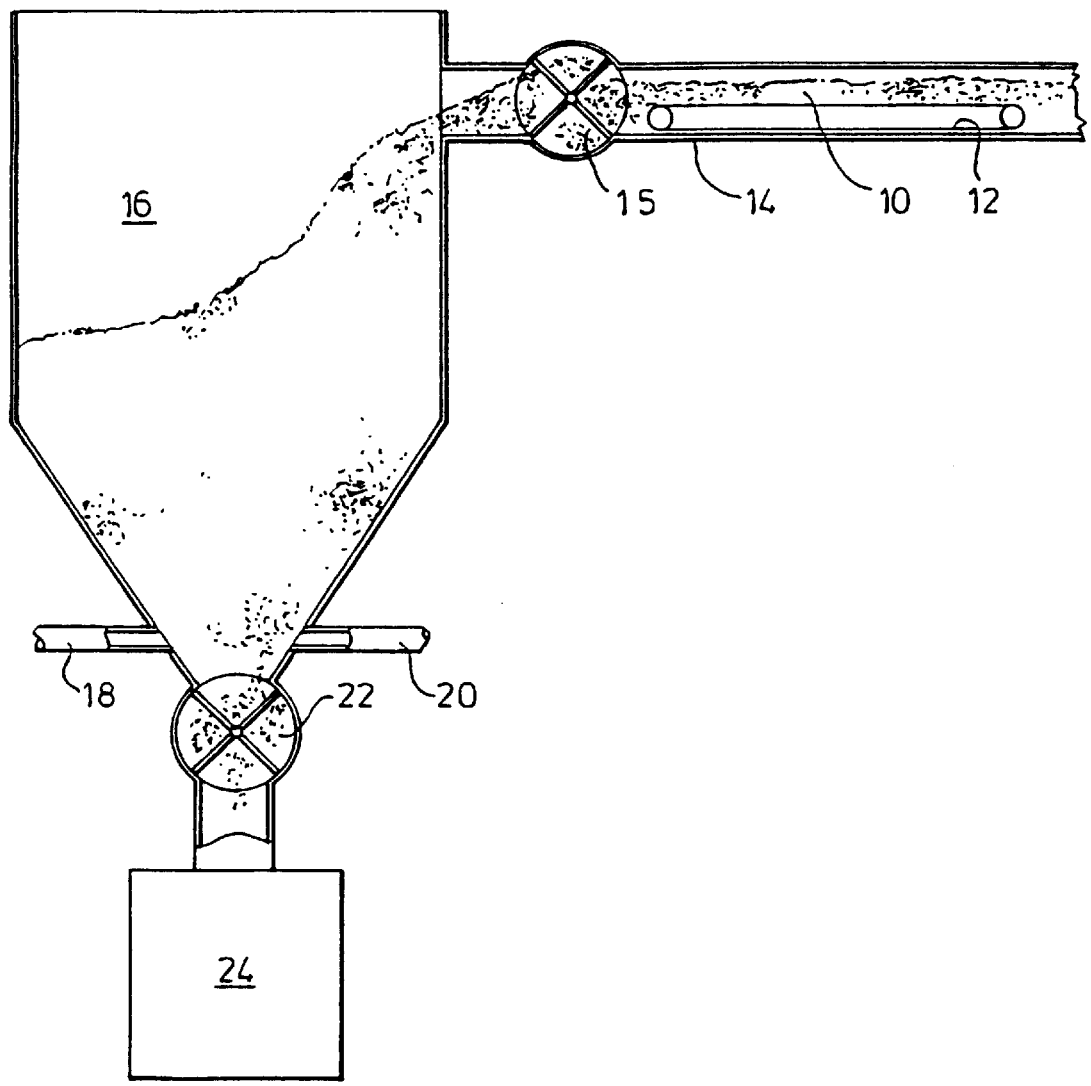

PRE-MIXED POLYMER COMPOSITIONS

CROSS REFERENCE TO RELATED APPLICATION

This application is a continuation of applicant's original application entitled PRE-MIXED POLYMER COMPOSITIONS filed Mar. 18, 1997, and given Ser. No. 08/809,172, now abandoned.

BACKGROUND OF THE INVENTION

This invention concerns a method for the production of pre-mixed porous polymer compositions, particularly though by no means exclusively suitable for use in the formation of impact absorbing surfaces or substrates for sports or childrens' play areas. Known such impact absorbing surfaces comprise granules of natural synthetic rubber, such as SBR and EPDM for example, in a matrix of polymer, such as polyurethane for example. The matrix may completely fill the spaces between the granules to give a non-porous composition of may simply coat the surfaces of the granules to cause them to adhere leaving the interstices between the granules void to give a porous product.

Either kind of composition may be laid to form a sports or play surface or to form a substrate to another surface such as that provided by synthetic turf for example.

The compositions are prepared on site immediately before installation by accurately metering out the granules, liquid pre-polymer and, if necessary, a catalyst and thoroughly mixing them prior to laying in the manner of asphalt.

The on-site preparation necessitates the use of mixing equipment and trained operators regardless of the size of the project. It would be desirable to eliminate the need for accurate on-site metering of constituent materials and thorough mixing thereof by pre-mixing the granule and pre-polymer and storing this mixture for later application. However, attempts to do so have previously been thwarted by unwanted polymerization of the pre-polymer induced at mixing by the presence of moisture on the surface of the granules or curing agents present in the granules and after bagging by the diffusion of atmospheric moisture through the bag walls.

It is an object of the present invention to provide a method for production of a pre-mixed porous composite which overcomes the disadvantages aforesaid.

SUMMARY OF THE INVENTION

The invention provides a method of producing a pre-mixed porous polymer composition. Granules of rubber are first encapsulated with a cured first pre-polymer. A second pre-polymer is then mixed with the encapsulated granules in a substantially moisture free environment. The mixture is then deposited into containers which are at least substantially impermeable to water vapor and the containers are stored for later use. Finally, the composition without further mixing is applied to a surface and the second pre-polymer is polymerized by reaction with water.

Any water present may be removed from the granules prior to encapsulation. The water to effect polymerization may comprise atmospheric water or water applied as an atomized mist. The granules may comprise natural or synthetic rubber and may be in the size range of from 1 mm to 10 mm. The encapsulating agent may be polyurethane. Processing of the granules may be carried out in a closed reactor or in an open system maintained at positive pressure by a stream of moisture free gas.

The initial removal of water from the rubber granules may be effected by evaporation at temperatures greater than room temperature. The evaporation may be carried out in a tunnel kiln. Alternatively, the water may be removed from the granules by washing with a moisture free solvent and the granules dried by a stream of moisture free gas. In both instances, the moisture free gas may be dry carbon dioxide, dry nitrogen or moisture free air.

The pre-polymer may be polyurethane based. The pre-polymer may contain a catalyst in sufficient quantity so as not to cause polymerization in the stored container but reduce the time required for polymerization after application of the composition.

The encapsulation of the granules and the mixing of pre-polymer with the rubber granules may be carried out with ribbon mixers. The water may be removed from the rubber granules by a chemical reaction.

BRIEF DESCRIPTION OF THE DRAWINGS

The single FIGURE of the drawing shows one manufacturing plant design for the production of pre-mixed polymeric compositions in accordance with the invention wherein water is removed from the rubber granules by evaporation.

DESCRIPTION OF PREFERRED EMBODIMENT

Rubber granules 10 of between one and ten mm diameter are fed onto a conveyor belt 12 of a tunnel kiln 14. A portion of the tunnel kiln 14 is heated to a temperature well in excess of room temperature, and the granules 10 are slowly passed through this portion in order to evaporate moisture from the surface of the granules. In a typical evaporation process the granules may be heated to temperatures of around 160° C. for a period of about ten minutes.

The granules, now near moisture free, are passed into a first ribbon mixer 15. A Diphenylmethane-4, 4'Di-Isocyanate pre-polymer is metered at the rate of 0.5% to 5% by weight of granules into the mixer 15. This first pre-polymer cures on the hot granules to encapsulate them with a coating of polyurethane. The mixture of the granules and first pre-polymer does not agglomerate due to the action of the mixer.

The encapsulated granules are emptied into a hopper 16. A stream of dry refrigerated carbon dioxide or nitrogen gas or moisture free air is expanded into the bottom of the hopper 16 at positive pressure with respect to ambient gas pressure via gas input ports 18 and 20. This gas stream has the effect of cooling the hot granules. The now heated exhaust gas from the hopper is ducted through the tunnel kiln at positive pressure. This process inhibits the intake of wet atmospheric air into the tunnel kiln.

From the hopper the granules are metered into a second ribbon mixer 22 along with an appropriate amount (5% to 35% by weight of the pre-coated granules) of a moisture curing polyurethane based second pre-polymer. A catalyst such as one which is amine based may be added with the second pre-polymer in sufficient quantity so as not to cause polymerization during storage but to reduce the time required for polymerization after application of the composition. The positive pressure of the dry gas also prevents ingress of wet atmospheric air during this operation.

The mixture of dry granules coated with cured first pre-polymer and uncured second pre-polymer from the respective first and second ribbon mixers 15 and 22 is ducted to a bagging assembly 24, wherein water impermeable bags are filled with the granule/pre-polymer mixture. The water impermeable bags may comprise aluminum foil lined polythene sacks. The bags are opened, filled and sealed in the stream of dry gas, and once again the positive pressure of the gas stream inhibits seepage of wet, atmospheric air into the dry confines of the bagging assembly and the bag itself.

After sealing, the bags of mixed polymeric composition may be stored before use. At ordinary temperatures storage for up to a year is possible. The water transmission rate of the containers is an important factor in determining the shelf-life of the product. This storage lifetime may be extended still further by storing at cooler temperatures. The polymeric composition may be installed to produce an impact absorbing surface by simply emptying the bags of pre-mixed polymeric composition and spreading the composition on a suitable subbase surface. The composition polymerizes by reaction with ambient atmospheric water vapor or by reaction with water applied as an atomized mist.

It will be appreciated that it is not intended to limit the invention to the above example only. Many variations, such as might readily occur to one skilled in the art, are possible without departing from the scope thereof as defined by the appended claims. One such variation involves the removal of moisture from the granules by washing them with a dry solvent.

Another variation involves coating the granules with an agent such as an isocyanide derivative. The agent removes water from the surface of the granules by chemical reaction.

We claim:

1. A method of producing a pre-mixed porous polymeric composition comprising
   a) removing substantially all water from granules of rubber,
   b) encapsulating said granules of rubber with a cured polyurethane first pre-polymer,
   c) mixing with the encapsulated granules a polyurethane second pre-polymer containing a catalyst in sufficient quantity so as not to cause polymerization but sufficient to reduce the time required for polymerization after application of the composition to a surface,
   d) depositing the mixture into a container substantially impermeable to water vapor,
   e) storing the container for later use, and
   f) applying the composition to a surface without further mixing and polymerizing the polyurethane second pre-polymer by reaction with water.

2. The method of claim 1 wherein the water is removed from the rubber granules by evaporation.

3. The method of claim 2 wherein the water is removed from the rubber granules by washing the granules with a moisture free solvent and then drying the granules by a stream of moisture free gas.

4. The method of claim 1 wherein the rubber granules are in a size range from 1 mm to 10 mm.

* * * * *